United States Patent
Blondé et al.

(10) Patent No.: US 7,933,017 B2
(45) Date of Patent: Apr. 26, 2011

(54) DEVICE, SYSTEM AND METHOD FOR CHARACTERIZING A COLOUR DEVICE

(75) Inventors: Laurent Blondé, Thorign Fouillard (FR); Sylvain Thiebaud, Noyal sur Vilaine (FR); Julien Thollot, Betton (FR)

(73) Assignee: Thomson Licensing, Boulogne Billancourt (FR)

( * ) Notice: Subject to any disclaimer, the term of this patent is extended or adjusted under 35 U.S.C. 154(b) by 1078 days.

(21) Appl. No.: 11/717,921

(22) Filed: Mar. 13, 2007

(65) Prior Publication Data

US 2009/0103802 A1   Apr. 23, 2009

(30) Foreign Application Priority Data

Mar. 31, 2006   (EP) .................................. 06300318

(51) Int. Cl.
*G01J 3/50*   (2006.01)
(52) U.S. Cl. ..................... 356/402; 356/405; 356/406
(58) Field of Classification Search ................. 356/402, 356/405

See application file for complete search history.

(56) References Cited

U.S. PATENT DOCUMENTS

2003/0011563 A1 *  1/2003   Wada ........................... 345/156
2003/0164927 A1     9/2003   Tsukada

OTHER PUBLICATIONS

Y. Kwak and L. MacDonald, Characterisation of a Desktop LCD Projector, pp. 179-194, Dec. 2000.
European Search Report, dated Sep. 21, 2006.

* cited by examiner

*Primary Examiner* — F. L Evans
(74) *Attorney, Agent, or Firm* — Robert D. Shedd; Jeffrey M. Navon

(57) ABSTRACT

A method for characterizing a color reproduction device. A first output color measure responding to a first reference input color value is measured under normal measurement conditions. The measurement conditions are modified and a second output color measure responding to the first reference input color value is measured under the modified measurement conditions. A transformation rule, enabling transformation between the second output color measure and the first output color measure, is calculated from the first color value and the second color value. A first set of output color measures responding to a set of input color values is measured under modified measurement conditions, and the first set of output color measures is converted, using the transformation rule, to a second set of output color measures. A system and a control device are also provided.

22 Claims, 3 Drawing Sheets

US 7,933,017 B2

DEVICE, SYSTEM AND METHOD FOR CHARACTERIZING A COLOUR DEVICE

This application claims the benefit, under 35 U.S.C. §119 of European Patent Application 06300318.0, filed Mar. 31, 2006

FIELD OF THE INVENTION

The invention relates to a method and a device for characterizing a digital colour reproduction device. In connection with the present invention, "colour reproduction device" means any kind of image output device, e.g. a film projector, a digital projector, a CRT monitor, a LCD monitor, a Digital Video Disc (DVD) storage device with linked monitor or a video cassette storage device with linked monitor.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Colours are among the most important aspects of a film. For good viewing, it is essential that a film reproduced for example in a cinema is as close as possible to the film director's intentions. It is thus necessary to characterise the digital reproduction device, e.g. the projector, to find out its colour behaviour, as this enables the modification of the input signals so that the displayed colours correspond as much as possible to the intended colours.

Another way of putting this is that the colour output values of reproduction devices are device dependent. An exemplary device dependent colour space is a Red Green Blue (RGB) colour space. This means that the same input colour values fed into two different reproduction devices may yield different output colours, because the colour space rendering associated with the respective devices are not identical.

As a consequence, to keep the same output colour it is often necessary to transform the colours of a specific image from one colour space to another when the reproduction device is changed. The transformation of colour values from one colour space to another is usually non-linear.

A necessary prerequisite for colour value transformation is to quantify, i.e. to measure colour values. The physiological colour impression of an observer is determined by the spectrum of the light entering into the observer's eye and the subsequent visual processing of the human brain. The human eye has three types of receptors for colour vision. Thus, it is possible under constrained viewing conditions to define a specific colour by a set of three values, which are called CIE tristimuli XYZ. The tristimuli have already been defined in 1931 by the CIE (Commission Internationale de l'Eclairage).

The tristimuli for a specific colour are calculated from the spectrum $S(\lambda)$ of the colour by integration with weighting functions:

$$X = \int S(\lambda) x(\lambda) d\lambda \qquad (1)$$

$$Y = \int S(\lambda) y(\lambda) d\lambda \qquad (2)$$

$$Z = \int S(\lambda) z(\lambda) d\lambda \qquad (3)$$

The tristimuli XYZ are still objective values even if weighted by weighting functions related to the human eye. Numerous measuring instruments such as photometers or video-photometers use XYZ tristimuli to give objective measures of colours.

In practice, the transformation of colour values from one device dependent colour space to another device dependent colour space includes an intermediate step. The intermediate step is to transform a device dependent colour space first into a device independent colour space. The intermediate step is a specific colour transformation called device model. A device model is established by colour characterization.

Colour characterization consists of the establishment of a colour transformation between device dependent colour values and device independent colour values. This transformation is usually calculated from measurements of device dependent and device independent colour values. For a reproduction device this procedure is as follows: A set of device dependent colour values are fed into the device and the reproduced colours are measured by an objective, optical measurement instrument giving a set of corresponding device independent colour values, for example measured in the XYZ or L*a*b* colour spaces.

One problem of device characterization is the high number of measurements necessary to establish a colour transform with acceptable precision. Since for practical reasons the number of measurements is limited, a problem becomes how to choose the limited number of measurements or how to increase the possible number of measurements within a given time.

When for example measuring a display device, a limited number of RGB input colours to be measured have to be selected. In an EPFL research report from 2002 of D. Alleysson and S. Susstrunk entitled "Caractérisation couleur dans la chaine cinématographique numérique: Projection et visualisation" (in English: Colour Characterization of the digital cinema chain), the authors propose to choose values for (R,G, B) of the type (n,0,0), (0,n,0), (0,0,n), (n,n,0), (n,0,n) and (0,n,n) with values for n between 0 and 255 in steps of 15 or 30.

A further problem is that in certain environments, light levels are not within the standard range of the color acquisition devices. In cinemas, for instance, as an example the maximum luminance may be of the order of 48 $Cd/m^2$ while the luminance associated with the darkest colours are in the order or less than 0.1 $Cd/m^2$.

Using colour acquisition devices in a standard manner (i.e. performing a direct measure of the displayed image) leads to noisy measures in the dark levels with quite long acquisition times, which is aggravated if, as above, this has to be repeated for many colour values.

It can therefore be appreciated that there is a need for a solution that obtains accurate measurements, particularly at low light levels, and decreases the measurement time as compared with standard methods.

The present invention provides such a solution.

SUMMARY OF THE INVENTION

In a first aspect, the invention is directed to a method for characterizing a colour reproduction device. A first output colour measure responding to a first reference input colour value is measured under normal measurement conditions. The measurement conditions are modified and a second output colour measure responding to the first reference input colour value is measured under the modified measurement conditions. A transformation rule is calculated from the first output colour measure and the second output colour measure, the transformation rule enabling transformation between an output colour value corresponding to modified measurement conditions and an output colour value corresponding to normal measurement conditions. A first set of output colour measures responding to a set of input colour values is measured under modified measurement conditions and converted, using the transformation rule, to a second set of output colour measures.

In a preferred embodiment, the transformation rule is wavelength dependent. It is advantageous that the transformation rule comprises a set of spectral amplification coefficients.

In a further preferred embodiment, the XYZ colour values corresponding to the first set of input colour values are calculated.

In a further preferred embodiment, the measurement conditions are modified by amplifying the light signal to be measured. It is advantageous that the light signal to be measured is amplified by diminishing the distance between reproduction device and the screen on which the light signal is measured, preferably by interposition of a target screen.

It is alternatively advantageous that the measurement conditions are modified by attenuating the light signal to be measured. This can be done by positioning an attenuating filter between the colour reproduction device and the optical instrument used for the measurement or by modifying the driving conditions of the colour reproduction device.

In yet a further preferred embodiment, the first reference input colour value corresponds to a white level.

In a second aspect, the invention is directed to a system for characterising a reproduction colour device. The system comprises an optical instrument adapted to measure a first output colour measure responding to a first reference input colour value under normal measurement conditions, a second output colour measure responding to the first reference input colour value under modified measurement conditions, and a first set of output colour measures responding to a set of input colour values under modified measurement conditions. The system further comprises a control unit adapted to calculate a transformation rule from the first output colour measure and the second output colour measure, the transformation rule enabling transformation between an output colour value corresponding to modified measurement conditions and an output colour value corresponding to normal measurement conditions, and convert, using the transformation rule, the first set of output colour values to a second set of output colour values.

In a preferred embodiment, the control unit is further adapted to calculate the XYZ colour values corresponding to the first set of input colour values.

In a further preferred embodiment, the system further comprises means for modifying the measurement conditions by amplification of the light signal to be measured. It is advantageous that the modifying means is a target screen adapted to be positioned between the colour reproduction device and a screen used during normal measurement conditions.

In an alternate preferred embodiment, the system further comprises means for modifying the measurement conditions by attenuation of the light signal to be measured. It is advantageous that the modifying means is an attenuating filter adapted to be placed between the colour reproduction device and the optical instrument. It is alternatively advantageous that the modifying means are adapted to modify the driving conditions of the colour reproduction device.

In a third aspect, the invention is directed to a control device for characterising a colour reproduction device. The control device comprises a processor adapted to obtain a first output colour measure responding to a first reference input colour value, the first output colour measure being measured under normal measurement conditions, obtain a second output colour measure responding to the first reference input colour value, the second output colour measure being measured under modified measurement conditions, calculate a transformation rule from the first output colour measure and the second output colour measure, the transformation rule enabling transformation between an output colour value corresponding to modified measurement conditions and an output colour value corresponding to normal measurement conditions, obtain a first set of output colour measures responding to a set of input colour values, the first set of output colour measures being measured under modified measurement conditions, and convert, using the transformation rule, the first set of output colour measures to a second set of output colour values.

In a preferred embodiment, the processor is further adapted to calculate the XYZ colour values corresponding to the first set of input colour values.

BRIEF DESCRIPTION OF THE DRAWINGS

The various features and advantages of the present invention and its preferred embodiments will now be described with reference to the accompanying drawings which are intended to illustrate and not to limit the scope of the present invention and in which.

DETAILED DESCRIPTION OF PREFERRED EMBODIMENTS

While the invention relates to characterisation of a colour reproduction device in general, the preferred embodiment is for characterisation of digital film projector, which will be used as an example throughout, but the person skilled in the art will appreciate other suitable colour reproduction devices—digital or analogue—may also be characterised.

Figure 1:
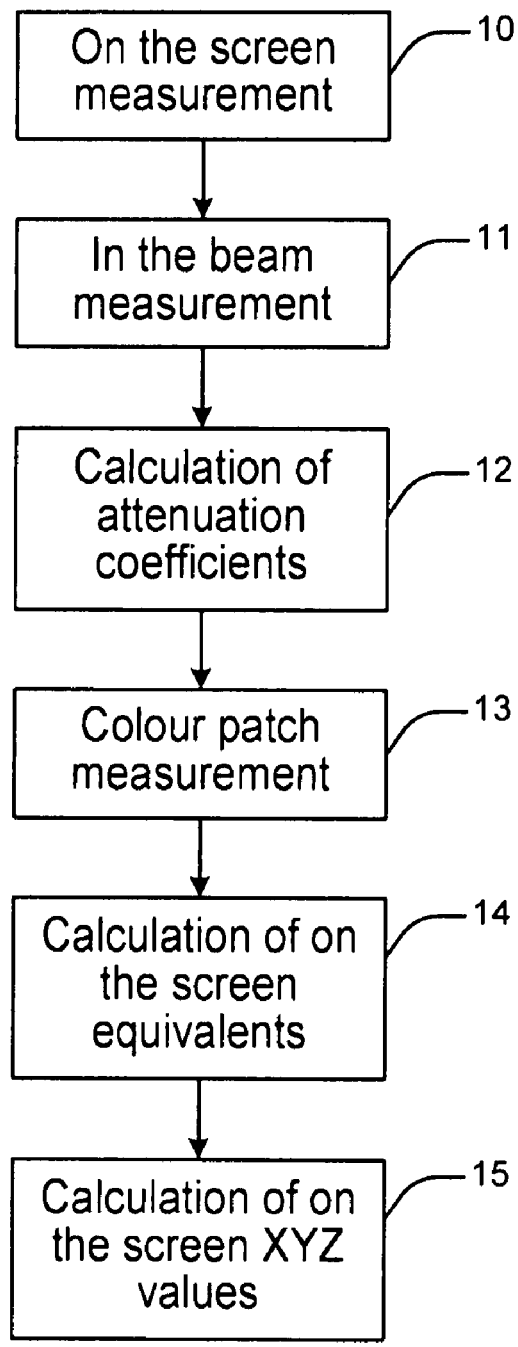
FIG. 1 is a flowchart of a preferred embodiment of the method according to the invention.
Figure 2:
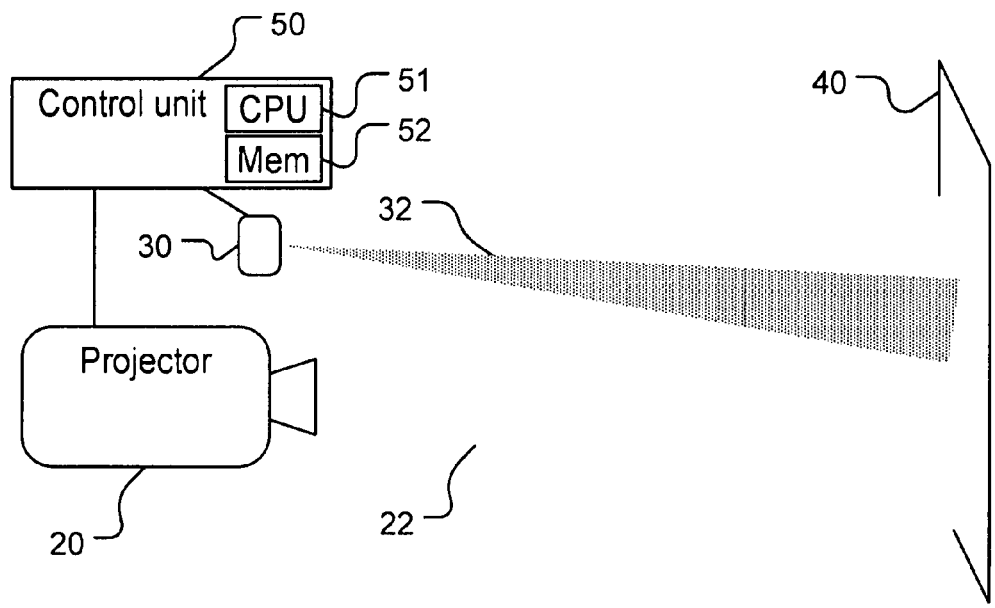
FIG. 2 illustrates the initial setup of the measuring environment.

FIG. 1 is a flowchart of a preferred embodiment of the method according to the invention. First, output colours are measured 10 in the setup illustrated in FIG. 2. The film projector 20 casts a beam 22 on the cinema screen 40 and a measuring device 30 measures (illustrated by "beam" 32) the displayed colour, preferably in the centre of the screen 40, to obtain cinema screen colour values $W_{S\lambda n}$. Preferably, white light is used. A control unit 50, comprising a processor 51 and a memory 52, is preferably at least functionally connected to the projector 20 to control the input colour values and to the measuring device 30 to obtain the measured colour values.

Figure 3:
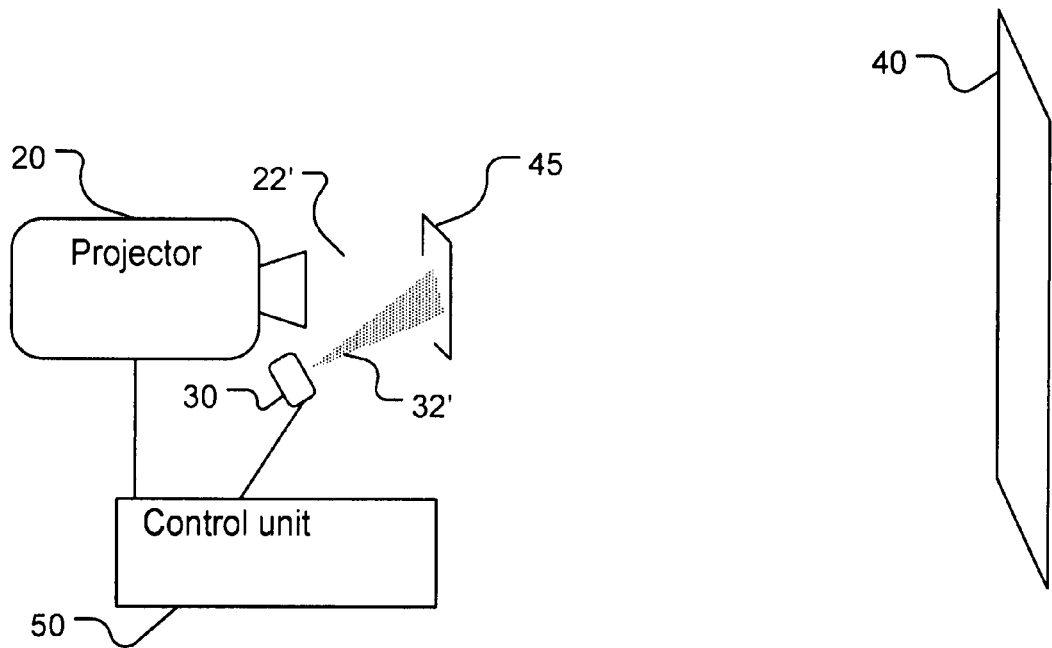
FIG. 3 illustrates the subsequent setup of the measuring environment.
Figure 4:
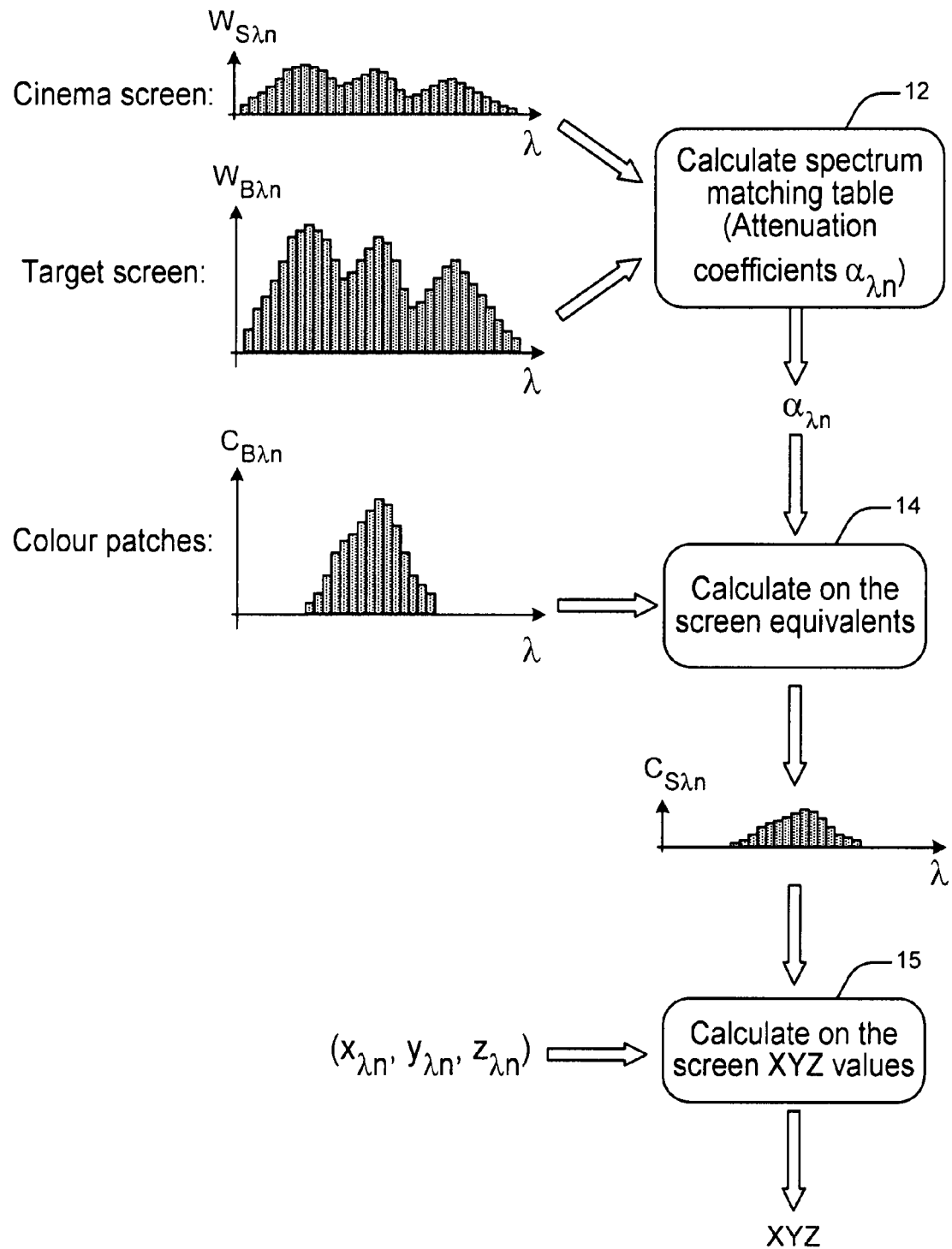
FIG. 4 is a further schematic illustration of the invention.

FIG. 3 illustrates the setup for the following steps of the method. A preferably white target screen 45 is interposed between the projector 20 and the cinema screen 40. The beam 22' cast by the projector 20 still displaying the same image—preferably white light—is now stopped by the target screen 45. This amplifies the beam 22' as it is concentrated to a much smaller area. The measuring device 30 measures 11 (illustrated by "beam" 32') the displayed colour in the same relative area on the target screen 45 as on the cinema screen 40—i.e. if the measurement was effectuated in the middle of the cinema screen 40, it is also effectuated in the middle of the target screen 45—to obtain target screen colour values $W_{B\lambda n}$. The target screen 45 is preferably placed a short distance from the projector 20. The control unit 50 remains connected as in FIG. 2, but the processor and the memory are not shown for the sake of clarity. It is preferred that the memory 52 stores colour values and various parameters for use in the method and that the processor 51 performs the necessary calculations.

The light level between the two measurement configurations—and hence between the cinema screen colour values $W_{S\lambda n}$ and the target screen colour values $W_{B\lambda n}$—is linked by an amplification factor. This amplification factor A is proportional to the ratio of the surface of the beam intersected by the cinema screen 40 and the surface of the beam intersected by the target screen 45. The amplification factor A also depends on the measurement configuration in each case, such as for example on the spectral response of the cinema screen 40 and the target screen 45, and on the orientation of the measuring device 30. Depending on the projection configuration, the amplification factor A may be of the order of 100 to 1000.

As the target screen 45 not necessarily has the same spectral response as the cinema screen 40 and as the measurement conditions also may have a spectral influence, the amplification factor A must be considered in the spectral domain. A global amplification factor A is therefore replaced by an amplification coefficient $A(\lambda)$ for a particular wavelength $\lambda$ or, in practice, a set of spectral amplification coefficients $\{A_{\lambda n}, \lambda_n \in [\lambda_1, \lambda_N]\}$ for a set of wavelengths.

The set of spectral amplification coefficients $A_{\lambda n}$ is calculated 12 from the cinema screen colour values $W_{S\lambda n}$ and the target screen colour values $W_{B\lambda n}$, both measured on the same reference colour $RGB_{REF}$, typically a white level. If the cinema screen colour values $W_{S\lambda n}$ are expressed as $\{W_{S\lambda n}, \lambda_n \in [\lambda_1, \lambda_N]\}$ and the target screen colour values $W_{B\lambda n}$ are expressed as $\{W_{B\lambda n}, \lambda_n \in [\lambda_1, \lambda_N]\}$, then the spectral amplification coefficients may be computed by $$A_{\lambda n} = \frac{W_{B\lambda n}}{W_{S\lambda n}}$$

for each spectral band.

These amplification coefficients $A_{\lambda n}$ can be inverted to evaluate the cinema screen 40 equivalent of a colour measured on the target screen 45. These inverse coefficients, called attenuation factors, may be expressed as $$\alpha_{\lambda n} = \frac{1}{A_{\lambda n}} = \frac{W_{S\lambda n}}{W_{B\lambda n}}.$$

combined, the attenuation factors $\alpha_{\lambda n}$ for the spectral bands compose a spectrum matching table allowing the conversion of colours measured on the target screen 45 to their equivalent colours on the cinema screen 40.

Although the step of colour patch measurement 13 may be performed before or between the previous steps, it is preferable to perform it once the amplification coefficients $A_{\lambda n}$ have been calculated.

A series of $RGB_i$ colour patches, i.e. a series of colour patches with colour $RGB_i$, are projected onto the target screen 45 and measured 13 by the measuring device 30, which gives a corresponding series of measured colour patch values $C_{B\lambda n}$ that may be expressed as $\{C_{B\lambda n}, \lambda_n \in [\lambda_1, \lambda_N]\}_i$. For each spectral band, the equivalent cinema screen colour value is calculated 14 by $C_{S\lambda n} = \alpha_{\lambda n} C_{B\lambda n}$, using the spectral matching table.

Finally, spectrum to XYZ conversion coefficients $(x_{\lambda n}, y_{\lambda n}, z_{\lambda n})$ are used to compute 15 the CIE1931 $X_i$, $Y_i$ and $Z_i$ measures for each input $RGB_i$ colour. $(X_{\lambda n}, Y_{\lambda n}, Z_{\lambda n})$ are the CIE1931 colour matching functions, i.e. the eye tristimuli sensitivity averaged for each spectral band.

$$\begin{cases} X_i = \sum_{n=1}^{N} C_{S\lambda ni} \cdot x_{\lambda n} \\ Y_i = \sum_{n=1}^{N} C_{S\lambda ni} \cdot y_{\lambda n} \\ Z_i = \sum_{n=1}^{N} C_{S\lambda ni} \cdot z_{\lambda n} \end{cases}$$

The projector 20 is then characterised when the $(X_i, Y_i, Z_i)$ are obtained.

In the description hereinbefore, the colour reproduction device was exemplified by a digital projector 20. The method described for its characterisation may also, with certain modifications, be used to characterise e.g. monitors.

Depending on technology, the peak luminance range of monitors is between 80 and 1000 $Cd/m^2$. To work around the recommended cinema white level value, 48 $Cd/m^2$, at least two different embodiments can be used:
- a neutral attenuation filter (optical density) can be placed in front of a monitor driven in its nominal conditions.
- the driving conditions of the monitor may be modified to decrease its peak luminance, e.g. by decreasing the beam current for a CRT or decreasing the LED current cyclic ratio for LED backlight monitors.

In the first embodiment, the high level $RGB_{REF}$ measure—corresponding to step 10—is performed without the attenuation filter in place, while the low level $RGB_{REF}$ measure—corresponding to step 11—and the $RGB_i$ data set measures—i.e. step 13—are performed with the filter in place. This allows the characterization of the spectral attenuation of the density filter in order to perform the conversion.

In the second embodiment, similar measures are done at high and low light level modifying the electronic driving conditions of the monitor. The validity of the conversion method between the two levels should be verified for each technology used. In a preferred embodiment, the control device (50) controls the modification of the driving conditions.

As will be appreciated, the general idea of the invention is to characterise a colour reproduction device by:
- acquiring a reference colour $RGB_{REF}$ in a standard configuration (direct view measurement);
- modifying (by amplification or attenuation) the light signal to be measured;
- acquiring the same reference colour $RGB_{REF}$ in the modified light signal configuration;
- measuring a RGB colour data set in the modified light signal configuration; and
- converting back the RGB colour measures to the levels corresponding to the standard acquisition configuration.

The two $RGB_{REF}$ measures are the base of the conversion from the amplified configuration to the standard configuration.

Preferably, acquisitions and conversions are realized in the spectral domain and only the final results are converted to the usage space (i.e. CIE1931 XYZ).

While the description hereinbefore has used exemplary XYZ and RGB colour spaces, the skilled person will appreciate that the invention may also be used with other colour spaces and that e.g. input values and output values may be spectral measurements.

It can thus be appreciated that the present invention allows characterisation of a colour reproduction device that may allow one or more of an increase of measurement quality, a reduction of measurement time, and the possibility to use a simpler and cheaper colour acquisition device, for example one adapted to work much above 48 Cd/m$^2$ to characterise colour reproduction devices displaying colours below that level.

The above the specification, examples and drawings provide a complete description of the manufacture and use of the composition of the invention. Since many embodiments of the invention can be made without departing from the spirit and scope of the invention, the invention resides in the claims herein after appended.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

The invention claimed is:

1. A method for characterizing a colour reproduction device comprising the steps of:
   measuring under normal measurement conditions a first light signal from said colour reproduction device responding to a first reference input colour value to obtain a first output colour measure;
   modifying the measurement conditions;
   measuring under modified measurement conditions a second light signal from said colour reproduction device responding to the first reference input colour value to obtain a second output colour measure;
   calculating a transformation rule from the first output colour measure to the second output colour measure;
   measuring under modified measurement conditions a first set of output colour measures responding to a set of input colour values input into said colour reproduction device; and
   converting, using the transformation rule, the first set of output colour measures to a second set of output colour measures.

2. The method of claim 1, wherein the transformation rule is wavelength dependent.

3. The method of claim 2, wherein the transformation rule comprises a set of spectral amplification coefficients.

4. The method of claim 1, further comprising the step of calculating the XYZ colour values corresponding to the first set of input colour values.

5. The method of claim 1, wherein the step of modifying the measurement conditions is performed by amplifying the light signal to be measured.

6. The method of claim 1, wherein the step of measuring the light signal from said colour reproduction device is performed by an optical instrument on a screen on which said colour reproduction device casts the output light signal.

7. The method of claim 6, wherein the light signal to be measured is amplified by reducing the distance between said reproduction device and the screen on which the light signal is measured.

8. The method of claim 7, wherein the distance is reduced by interposition of a target screen.

9. The method of claim 1, wherein the step of modifying the measurement conditions is performed by attenuating the light signal to be measured.

10. The method of claim 9, wherein the light signal to be measured is attenuated by positioning an attenuating filter between the colour reproduction device and the optical instrument used for the measurement.

11. The method of claim 9, wherein the light signal to be measured is attenuated by modifying the driving conditions of the colour reproduction device.

12. The method of claim 1, wherein the first reference input colour value corresponds to a white level.

13. A system for characterising a colour reproduction device comprising:
   means for modifying normal measurement conditions into modified measurement conditions;
   an optical instrument adapted to measure an output colour value from said colour reproduction device responding to an input colour value under certain measurement conditions;
   a control unit adapted to:
      calculate a transformation rule from a first output colour measure from said colour reproduction device responding to a first reference input colour value, obtained by said optical instrument under normal measurement conditions, toward a second output colour measure from said colour reproduction device responding to said first reference input colour value, obtained by said optical instrument under measurement conditions modified by means for modifying measurement conditions; and
      convert, using the calculated transformation rule, a first set of output colour values from said colour reproduction device responding to a set of input colour values, measured by said optical instrument under measurement conditions modified by said means for modifying measurement conditions, into a second set of output colour values.

14. The system of claim 13, wherein the control unit is further adapted to calculate the XYZ colour values corresponding to the first set of input colour values.

15. The system of claim 13, wherein the means for modifying the measurement conditions proceeds by amplification of the light signal to be measured.

16. The system of claim 13, wherein the optical instrument is adapted to measure the output colour value from said colour reproduction device on a screen on which said colour reproduction device casts the output light signal.

17. The system of claim 16, wherein the modifying means is a target screen adapted to be positioned between the colour reproduction device and the screen used during normal measurement conditions.

18. The system of claim 13, wherein the means for modifying the measurement conditions proceeds by attenuation of the light signal to be measured.

19. The system of claim 18, wherein the modifying means is an attenuating filter adapted to be placed between the colour reproduction device and the optical instrument.

20. The system of claim 18, wherein the modifying means are adapted to modify the driving conditions of the colour reproduction device.

21. A control device for characterising a colour reproduction device comprising a processor adapted to:
- obtain a first output colour measure, under normal measurement conditions, responding to a first reference input colour value input into said colour reproduction device;
- obtain a second output colour measure, under modified measurement conditions, responding to the first reference input colour value input into said colour reproduction device;
- calculate a transformation rule from the first output colour measure to the second output colour measure;
- obtain a first set of output colour measures, under modified measurement conditions, responding to a set of input colour values input into said colour reproduction device; and
- convert, using the transformation rule, the first set of output colour measures to a second set of output colour values.

22. The control device of claim 21, wherein the processor is further adapted to calculate the XYZ colour values corresponding to the first set of input colour values.

* * * * *